United States Patent [19]

Bernhardt et al.

[11] Patent Number: 5,563,659
[45] Date of Patent: Oct. 8, 1996

[54] PROTECTIVE HOUSING FOR OPTICAL EQUIPMENT

[75] Inventors: Rainer Bernhardt, Rosbach; Herbert Glock, Wetzlar, both of Germany

[73] Assignee: Videor Technical E. Hartig GmbH, Rodermark, Germany

[21] Appl. No.: 371,190

[22] Filed: Jan. 11, 1995

[30] Foreign Application Priority Data

Jan. 11, 1994 [DE] Germany ............... 44 00 475.3

[51] Int. Cl.$^6$ ................. H04N 5/225; G03B 29/00
[52] U.S. Cl. ................................. 348/373; 396/428
[58] Field of Search .................... 348/373, 374; 354/81, 471; 361/380, 391, 394; 312/22, 199, 291, 294, 308, 263, 223.1, 223.2; H04N 5/225

[56] References Cited

U.S. PATENT DOCUMENTS

| | | | |
|---|---|---|---|
| 2,884,296 | 4/1959 | Meilinger et al. | 312/263 |
| 4,414,576 | 6/1983 | Randmae | 358/229 |
| 5,115,263 | 5/1992 | Bernhardt et al. | 354/81 |
| 5,184,173 | 2/1993 | Kirigaya | 354/471 |

*Primary Examiner*—Wendy Garber
*Assistant Examiner*—Andrew B. Christensen
*Attorney, Agent, or Firm*—Felfe & Lynch

[57] ABSTRACT

A protective housing for surveillance video cameras has a tubular housing shell (1) which can be slid back and forth in a telescoping manner relative to an equipment carrier (2), which can be installed in a fixed position. The housing shell (1) and the equipment carrier (2) are connected by a sliding guide piece (4), which forms a pivot bearing (S-S) after the shell has been pulled out as far as it can go to allow the housing shell (1) to pivot around the end of the equipment carrier (2). To facilitate installation and to avoid corners from being cut off the viewing angle during installation and adjustment, both the housing shell (1) and the equipment carrier (2) are provided with guide grooves (11, 15), arranged in pairs; and the sliding guide piece (4) is guided by means of first and second projections (18, 19) so that it can slide relative to both the housing shell (1) and the equipment carrier (2) in their guide grooves (11, 15). At least one of the projections (18, 19) of the sliding guide piece (4) forms the pivot bearing (S-S) between the housing shell (1) and the equipment carrier (2). The sliding guide piece can be either a molded part or a wire stirrup.

15 Claims, 6 Drawing Sheets

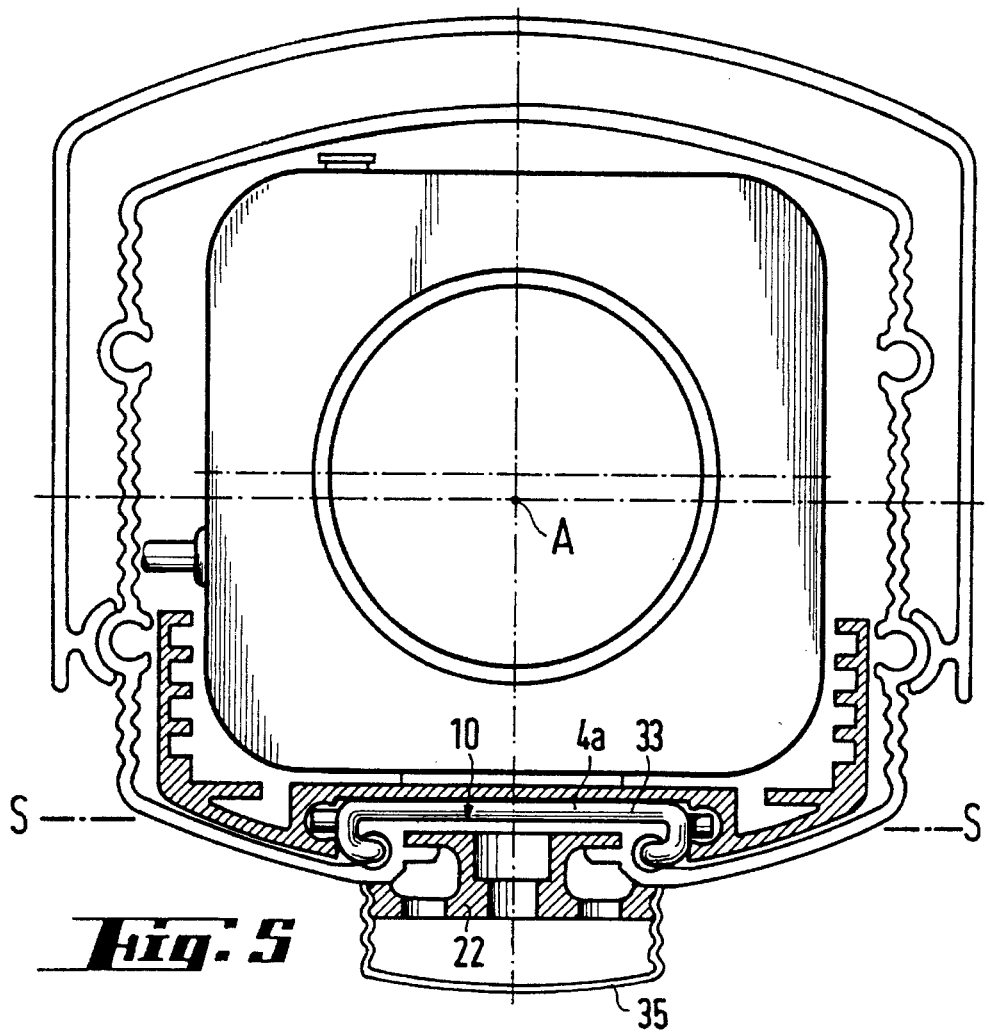
Fig. 5
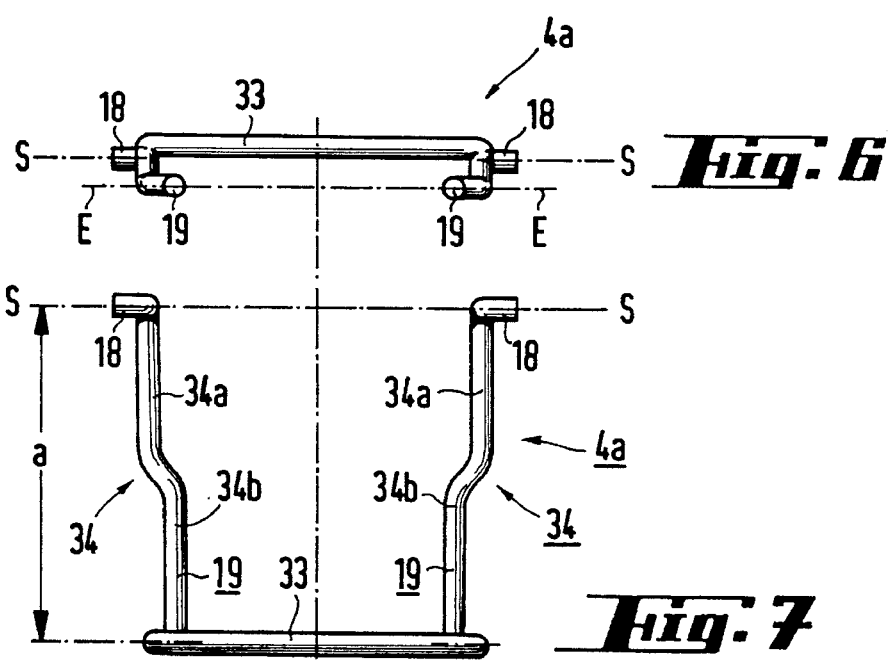
Fig. 6
Fig. 7

PROTECTIVE HOUSING FOR OPTICAL EQUIPMENT

BACKGROUND OF THE INVENTION

The invention pertains to a protective housing for optical equipment, especially for video surveillance cameras, with a tubular housing shell, which can be slid back and forth in a telescoping manner with respect to a housing carrier, which can be mounted in a fixed position. The housing shell and the equipment carrier are connected to each other by a sliding guide piece, which forms a pivot bearing after the housing shell has been pulled out as far as it can go, so that the shell can be pivoted downward around the end of the equipment carrier.

Protective housings of this kind serve to protect the optical equipment installed in them against mechanical effects, including those associated with sabotage, and also, when the protective housing is mounted outdoors, against weather-related influences. For this purpose, the protective housing is sealed at the forward end, i.e., in the "viewing direction" of the optical unit, by a window with a frame-shaped window flange; it is closed off at the rear by a rear wall, which usually holds the electrical devices such as cable inlets and leadthroughs. As a rule, the orientations of protective housings of this type can also be adjusted. They can also be mounted on an adjustable bracket or a so-called "tilt-and-swivel head" which can be motor-driven around two perpendicular axes, so that the housing can be moved into various positions. A considerable amount of installation work is required, however, both to install the protective housing on its bracket and also to install the optical equipment and the associated electrical and electronic devices in the housing.

Protective housings are therefore already known, in which the housing shell can be flipped open along two parting lines with axes which are parallel to each other. This leads, however, to sealing problems at the two parting lines mentioned and also at the joints which are present between the flip-up housing part and the two walls, i.e., the window wall and the rear wall.

As a result, it has long been standard practice to use a housing shell which consists of a piece of extruded material with a tubular profile, which already contains essentially all the necessary fastening and guide elements such as screw holes, mounting and stiffening ribs, and guide grooves for the sliding connection with the equipment carrier. In housing shells of this type, a smooth separating cut is sufficient to produce satisfactory sealing surfaces as required for the window wall and the rear wall. On the other hand, a housing shell sealed on all sides again leads to problems with the installation of the internal parts. Therefore, protective housings have also become known in which, after the screw joint holding the housing shell to the rear wall has been unfastened, the housing shell can be pulled out like a telescope from the equipment carrier with the internal parts.

EP-B1 No. 285,922 discloses two embodiments of a protective housing of the general type described above. In one case, the equipment carrier consists of a single profiled rail, connected to the rear wall; after the housing shell has been pushed on, this rail and the video camera are both inside the housing. The attachment occurs in this case by way of the rear wall. In the other case, the equipment carrier consists of two profiled rails, which can pivot with respect to each other. After the shell has been pushed into position, the upper rail is inside the housing shell, while the other rail, i.e., the lower one, winds up underneath the housing shell. In both cases, the end of the equipment carrier facing away from the rear wall is provided with a rigidly attached angle piece, at the end of which two laterally projecting cylindrical projections are provided, which engage in corresponding guide grooves, one of which is on top of the housing floor and the other on the bottom of the housing floor. The housing shell has a stop, which comes to rest against this angle piece when the shell has been moved out as far as it can go. In this position, it is possible to flip the housing shell downward around the cylindrical projections of the angle piece, so that the housing shell hangs down from the forward end of the equipment carrier. During the installation work, however, the now upward-pointing rear end of the housing shell is in the way, especially since the sliding guide piece has an angular shape. This means that the rear end of the shell still projects upward to a significant extent beyond the plane of the lower rail part of the equipment carrier, i.e., all the way up to a point in front of the upper rail part of the equipment carrier. This interferes considerably with the installation work on the front end of the equipment carrier, as part of which it may also be necessary to attach a heating element for the housing window, for example, and to wire this element to a power source. In the second embodiment, the lower rail part of the equipment carrier makes it possible to attach the unit in an adjustable manner to a bracket or to a tilt-and-swivel head.

Of particular importance, however, are the optical problems. The optical axis usually points at a certain downward angle, because protective housings of this type are usually mounted at a height where they are out of reach of people. Because the optical equipment usually includes a wide-angle lens or a wide-angle zoom lens, the optical system cannot be adjusted if the housing shell is suspended in the known manner like a pendulum, because the rear end of the shell cuts off a large part of the angular field. In addition, the housing shell is also provided with a protective roof, the rear end of which extends backward at least about 5 cm beyond the end of the housing shell, so that the rear wall of the housing is also offered protection by this roof. The rear wall of the housing extends for a considerable distance in the direction of the optical axis. The projecting part of the protective roof cuts off even more of the angular field and therefore creates considerable interference. Now, although appropriate longitudinal guides are provided so that the protective roof can be slid back along the housing shell, it is extremely difficult to accomplish this sliding action, because the roof may not be allowed to move unintentionally. Furthermore, the housing shell is provided with a protective coating such as with an anodized layer or a layer of resin, which would be damaged by a sliding movement of this kind. Such damage would lead not only to an unattractive appearance but also to the premature corrosion of the housing shell.

SUMMARY OF THE INVENTION

The invention is therefore based on the task of providing a protective housing of the general type described above, in which the rear of the housing shell and a protective roof possibly attached thereto no longer cause any interference with the installation work and no longer cut off any corners from the angular field of the lens after the housing has been flipped into the down position.

According to the invention, the equipment carrier is provided with a first pair of guide grooves and the housing shell is provided with a second pair of guide grooves. The sliding guide piece is guided by first and second projections in the first and second guide grooves and is thus able to slide relative to both the housing shell and the equipment carrier. At least one of the projections of the sliding guide piece forms the pivot bearing between the housing shell and the equipment carrier.

Because of way in which the protective housing according to the invention with the sliding guide piece is designed, the distance which the housing shell can move with respect to the equipment carrier is greatly increased without any other change in the dimensions. This leads in turn to the result that the rear of the housing shell and the protective roof possibly attached thereto not only arrive in a much lower position underneath the equipment carrier, after the housing shell has been swung into the down position, but can also be moved with respect to the equipment carrier toward the rear wall of the housing. There is no longer any obstacle to the installation work, and no more corners are cut off the angular field of the lens, even when wide-angle lenses or wide-angle zoom lenses are used.

It is especially advantageous for the first and second projections to be separated from each other by a distance a in the direction of shell movement, this distance being equal at least to the projection of the housing roof beyond the rear of the housing shell. Distance a refers initially to the direction in which the shell slides. After the housing shell has been swung into the down position, however, it describes what is essentially a vertical shift in the position of the housing shell.

It is also especially advantageous for the projections of the sliding guide piece engaging in the guide grooves of the equipment carrier to form a pivot bearing S-S.

According to an especially advantageous first embodiment of the invention, the sliding guide piece is designed as U-shaped profile with a yoke and two parallel shanks. The ends of the shanks at the rear with respect to the sliding direction are provided with two aligned projections, pointing away from each other, which engage in the guide grooves of the equipment carrier. The ends of the shanks at the front with respect to the sliding direction are provided with two aligned projections, pointing toward each other, which engage in the guide grooves of the housing shell.

According to a second embodiment, the sliding guide piece is designed in an especially advantageous manner as a wire stirrup with several right-angle bends, which, as seen from above, perpendicular to the sliding direction, is designed in the form of a "U" with a yoke and two shanks. Each of the shanks, which extend in the sliding direction, has a partial length which is outside the guide grooves in the housing shell and in the equipment carrier. Each shank also has one additional partial length, which engages as a projection in one of the guide grooves of the housing shell. The free ends of the partial lengths which are the farthest apart are provided with right-angle projections to engage in the guide grooves of the equipment carrier.

BRIEF DESCRIPTION OF THE DRAWING

FIG. 5 shows a radial section similar to FIG. 3, but in this case a second exemplary embodiment with a wire stirrup as sliding guide piece is illustrated;

FIG. 6 shows a front view of the wire stirrup according to FIG. 5;

FIG. 7 shows a top view of the wire stirrup according to FIG. 6;

DETAILED DESCRIPTION OF THE PREFERRED EMBODIMENTS

Figure 1:
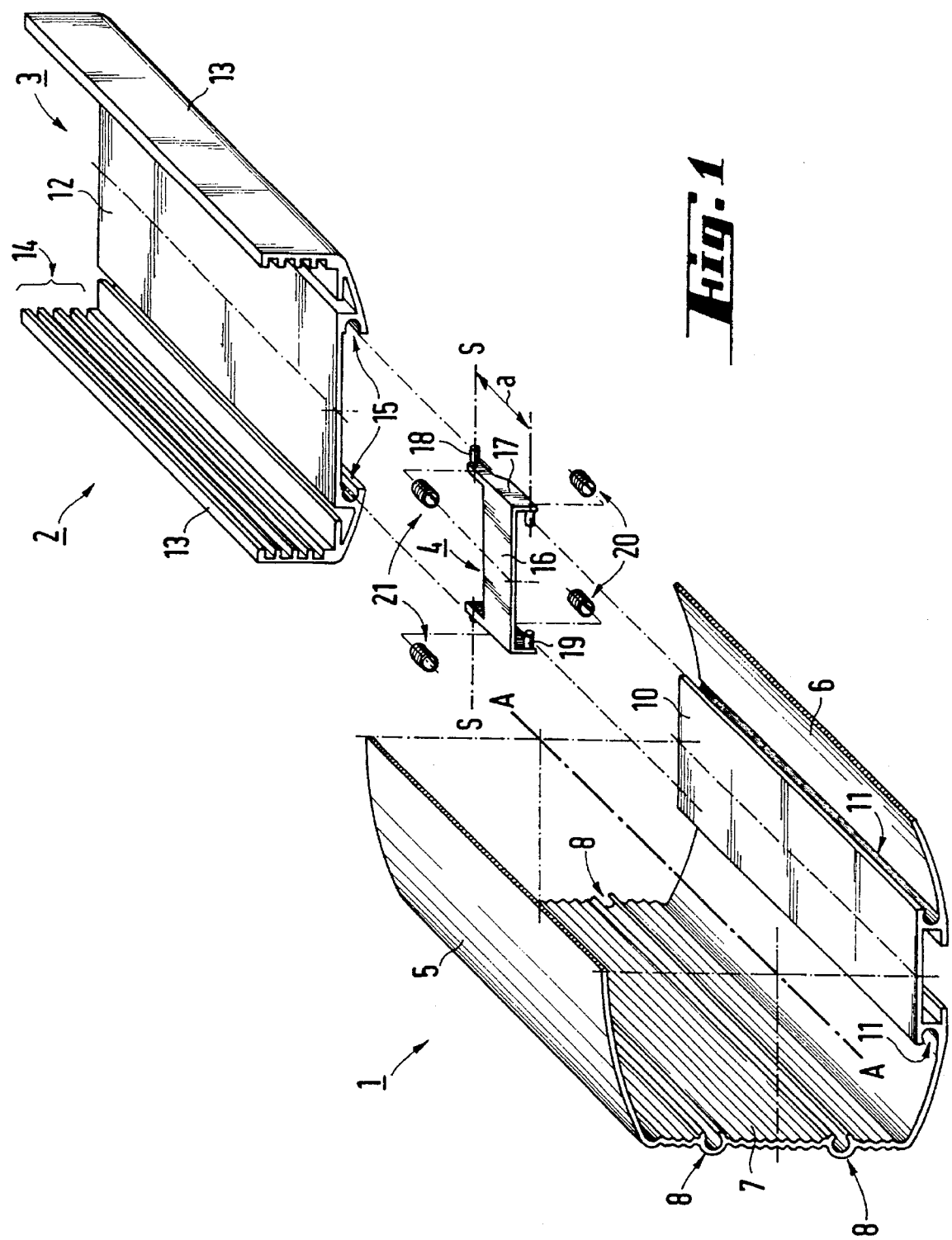
FIG. 1 shows an exploded view, in perspective, of the protective housing of a first exemplary embodiment with the interacting parts essential to the function of the housing.

FIG. 1 shows a housing shell 1, the length of which, because of the selected perspective, appears foreshortened, as does the length of an equipment carrier 2, only the upper rail part 3 of which is shown here. Housing shell 1 and equipment carrier 2 are connected to each other by a sliding guide piece 4.

Figure 2:
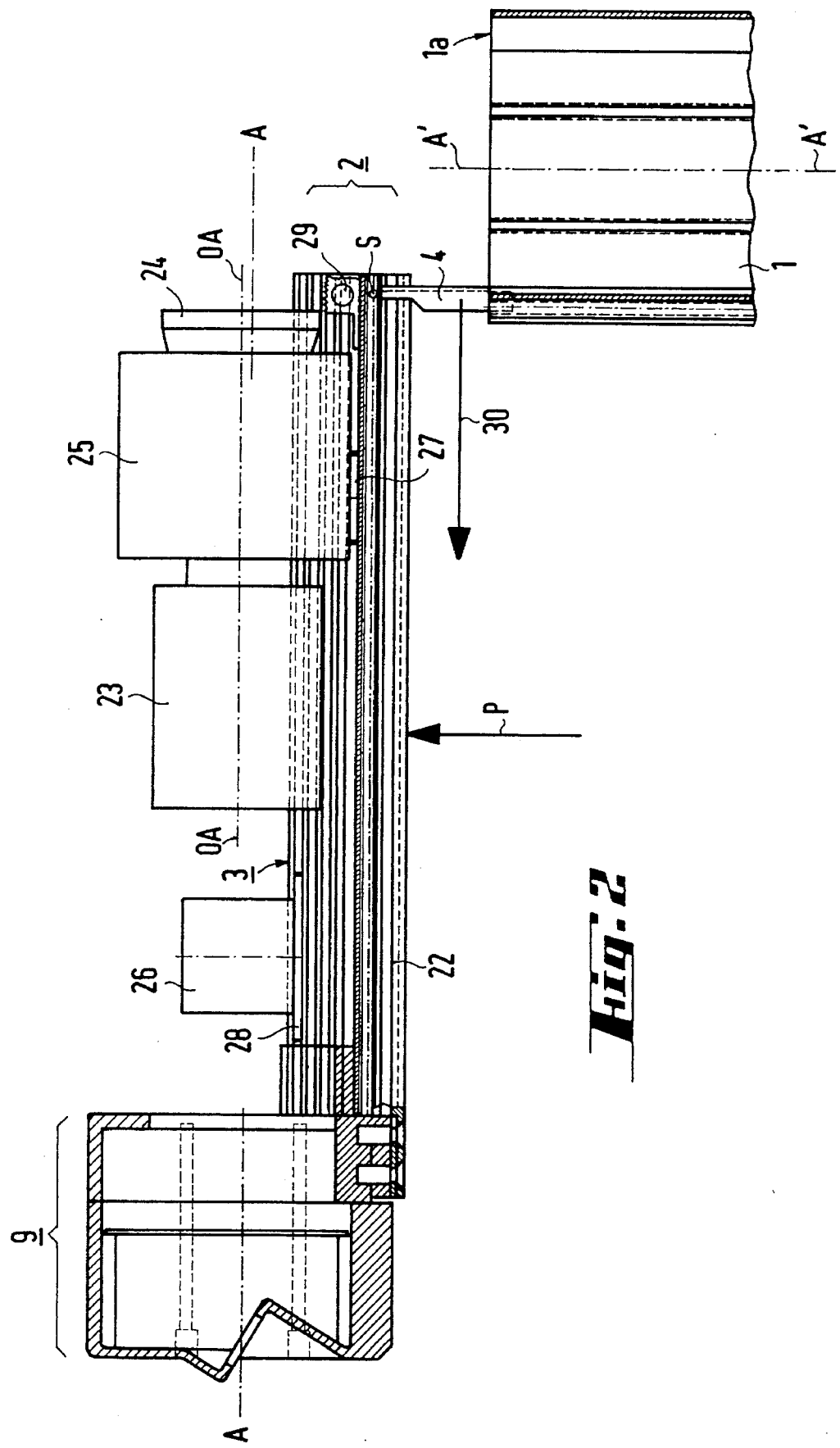
FIG. 2 shows a partial, longitudinal section through a protective housing with an installed video camera, after the housing shell according to FIG. 1 has been pivoted downward.

Housing shell 1 is formed by a piece of extruded section and has a cylindrical, upward-curving roof part 5 and a downward-curving bottom part 6, which are connected to each other by two side walls 7, only one of which is shown here. Side walls 7 have a corrugated profile and are provided with two screw channels 8, into which the attachment screws for a window wall (not shown here) and a rear wall 9 can be screwed, as shown in FIG. 2. Floor part 6 has a floor elevation 10, which forms two guide grooves 11 between it and the remaining part of floor 6; these grooves are designed to serve simultaneously as screw channels, which will be described in greater detail further below. The open sides of guide grooves 11 face away from each other.

Equipment carrier 2 also consists of a piece of extruded section and has a floor yoke 12 and two shanks 13, which project vertically up from the floor. These shanks are provided along their inside surfaces with insertion grooves 14, which are situated one above the other. The grooves of one shank face those of the other. Support plates (not shown) for the optical equipment can be pushed into these grooves at different heights. Details of this type, however, belong to the state of the art and will not be dealt with in further detail here.

Floor yoke 12 has additional guide grooves 15 on its bottom surface. These grooves are designed to serve simultaneously as screw channels, and the open sides of the grooves face each other.

Figure 3:
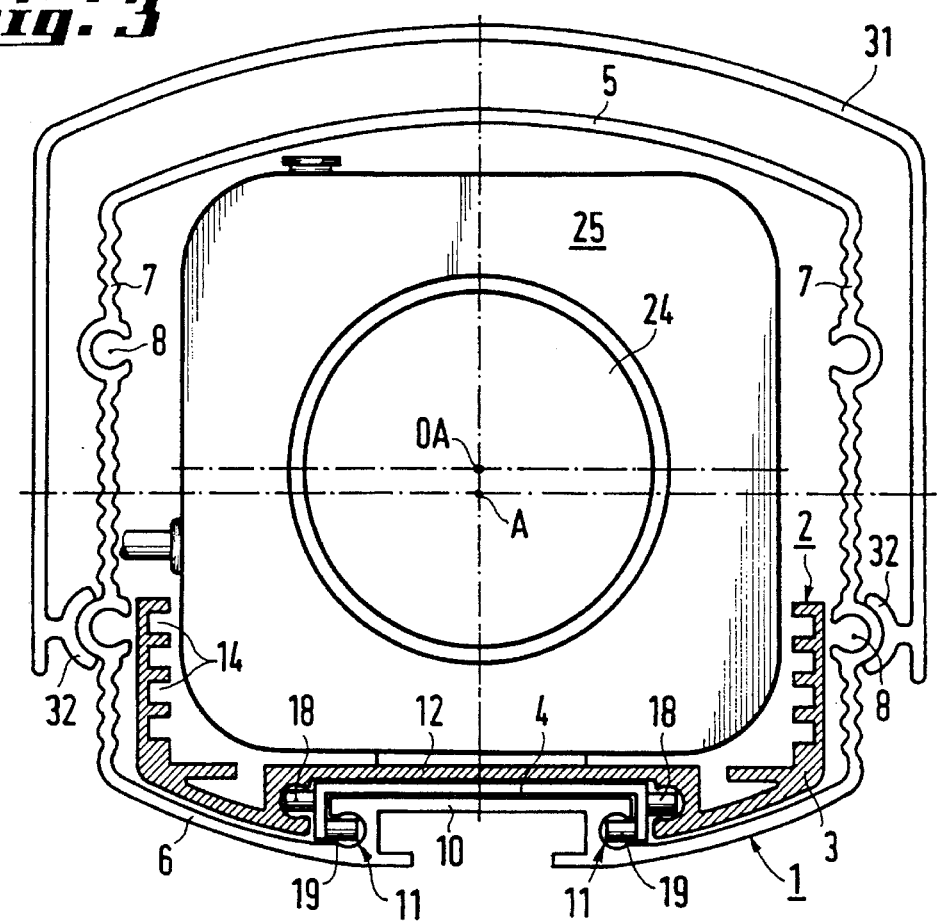
FIG. 3 shows a radial cross section through a protective housing according to FIG. 2 in the finished, assembled state with an installed video camera.
Figure 4:
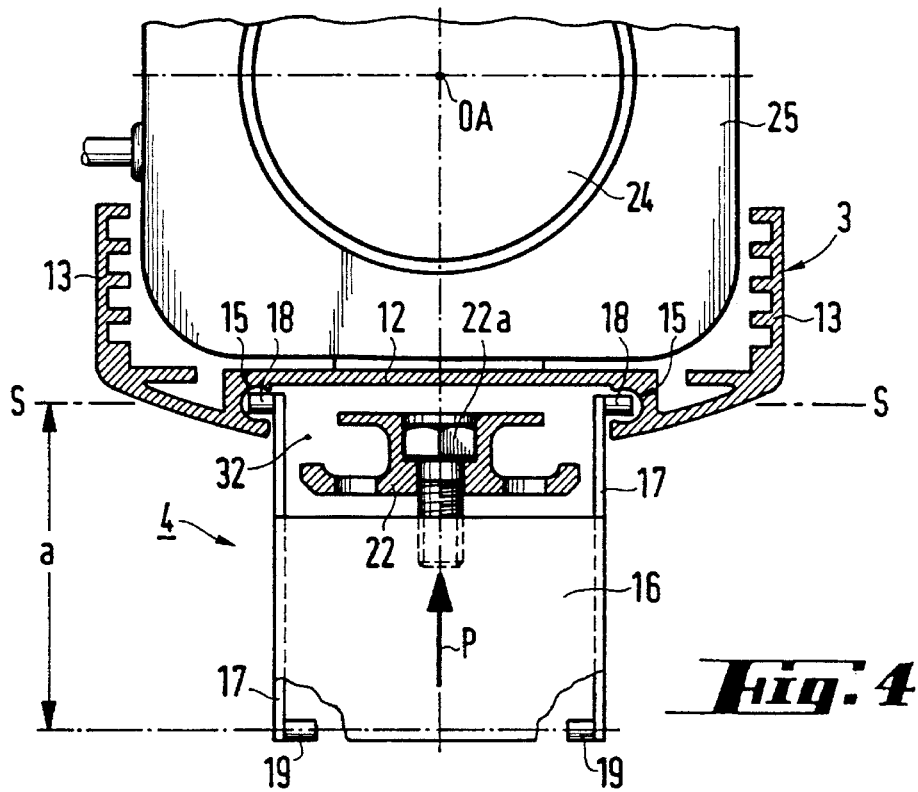
FIG. 4 shows a radial cross section similar to FIG. 3, but in this case with the sliding guide piece in the swung-down position, with the housing shell removed.

The (disconnectable) connection between housing shell 1 and equipment carrier 2 is accomplished by means of sliding guide piece 4, which also consists of a yoke 16 and two shanks 17, projecting downward from the yoke at right angles. On the end which is at the rear with respect to the sliding direction, shanks 17 have cylindrical projections 18, which are coaxial and in line with each other; they point outward and, when the unit is assembled, they engage in guide grooves 15, as illustrated in FIGS. 3 and 4. At the end which is at the front with respect to the sliding direction, shanks 17 have additional projections 19, which are coaxial and in line with each other and which point inward in such a way that they can engage in guide grooves 11 of housing shell 1, as illustrated in FIG. 3. The relative dimensions are selected here so that there is sufficient room between the outside edges of guide grooves 11 and the inside edges of guide grooves 15 and also sufficient room between floor elevation 10 and the bottom surface of floor yoke 12 to allow sliding guide piece 4 to move between these various components relative to both housing shell 1 and equipment carrier 2. The clearances are illustrated to scale in FIG. 3. This freedom of movement terminates, first, at stop bodies 20, which are screwed into the rear end of guide grooves 11, and, second, at additional stop bodies 21, which are screwed into the front end of guide grooves 15. For this purpose, stop bodies 20, 21 are designed as threaded plugs.

In the pulled-out state of housing shell 1 according to FIGS. 2 and 4, the rear, cylindrical projections 18 form a pivot bearing S-S. The reason why it has been stated that at least one projection is involved is to include the case in which the two cylindrical projections 18 are formed by the ends of a continuous rod. As soon as projections 18 rest against stop bodies 21, the pivot axis, that is, the axis of pivot bearing S-S, is located and defined; housing shell 1 has sufficient freedom of movement with respect to equipment carrier 2 that it can now be flipped down, as illustrated in FIG. 2.

Figure 8:
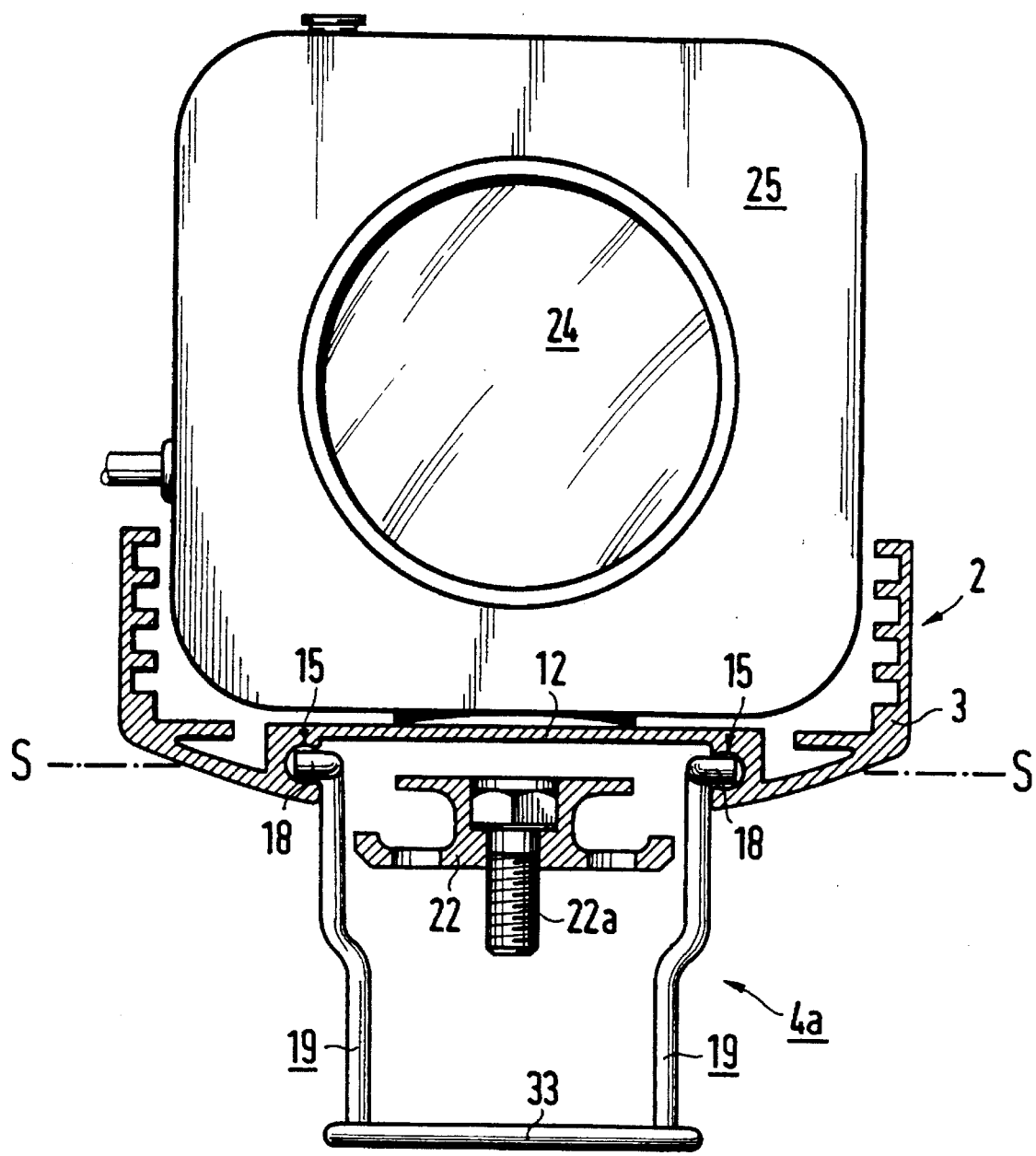
FIG. 8 shows a radial section similar to FIG. 5, but in this case with a wire stirrup in a position according to FIG. 7.

It can also be seen in FIG. 2 that equipment carrier 2 consists of an upper rail part 3 and a lower rail part 22, which is also designed as an extruded section and extends parallel to, and a certain distance away from, upper rail part 3, as can be seen in FIGS. 4, 5, and 8. Lower rail part 22 is supported at point P by a screw 22a, which attaches the part to a bracket or to a tilt-and-swivel head. Rail parts 3 and 22 are connected to each other by way of rear wall 9.

As can also be seen from FIG. 2, a video camera 23 with a lens 24 is attached to upper rail part 3; the lens is adjusted by way of a lens drive 25. On upper rail part 3, furthermore, an electronic unit 26 is attached, but this is of no importance to the design of the protective housing according to the invention. The pertinent components are held by mounting plates 27, 28, which are slid at different heights into insertion grooves 14 according to FIG. 1. Details of rear wall 9 are not an object of the invention either, and therefore there is no need for any further discussion of it. A window heater 29, designed as a heating resistor, is also attached to upper rail part 3, but this heater also belongs to the state of the art. The housing axis is designated A-A; the optical axis is designated OA-OA.

FIG. 2 reveals the essential results of the invention. That is, this figure shows that, because of the length of pulled-out sliding guide piece 4, the rear or upper edge 1a of housing shell 1 is lowered not only with respect to equipment carrier 2 but also especially with respect to optical axis OA-OA. Housing shell 1 can, in this position, be pushed in the direction of arrow 30 to the immediate vicinity of attachment point P, which means that edge 1a is moved behind the forward end of equipment carrier 2. In that position, it neither hinders the installation work nor cuts off any corners from the angular field of lens 24 (see FIG. 9 on this point). After housing shell 1 has been pushed in the direction of arrow 30, it is also possible to remove sliding guide piece 4 by its projections 18 out of guide grooves 15 by rotating the housing shell 1. The housing shell can thus be conveniently removed from equipment carrier 2 without the need to loosen any screws. This, too, is a possibility not found in the state of the art.

From FIG. 3 it is possible to see the following: Side walls 7 and roof part 5 of housing shell 1 are enclosed by a protective roof 31 of similar geometric shape, which has arc-shaped guide projections 32, which can be snapped over the outside walls of screw channels 8. When the protective housing is mounted outdoors, this protective roof 31 can also project a few centimeters toward the rear beyond rear wall 9 to protect it from solar radiation. The rear edge of protective roof 31 is therefore still situated clearly beyond edge 1a and, if it were not for the solution according to the invention, this edge of the roof would at least partially obstruct the angular field of lens 24 when housing shell 1 is positioned as shown in FIG. 2. Thanks to the invention, however, no such obstruction occurs (see FIG. 9).

It can also be seen from FIG. 4, furthermore, that sliding guide piece 4 is provided with an opening 32 at the rear of shanks 17, i.e. the rear with respect to the direction in which the piece slides. The length (and width) of this opening is such that sliding guide piece 4, when in the flipped-down position shown, can be slid, together with housing shell 1, past lower rail part 22 of equipment carrier 2, located underneath the housing shell, in the direction of rear wall 9 of protective housing 1. This is achieved by reducing the length of yoke 16 to a suitable extent, as clearly shown in FIG. 4.

FIG. 4 also shows that, in the direction in which the sliding piece slides, a distance "a" preferably a few centimeters long, is present between the axes of projections 18, 19 to make it possible for edge 1a to assume the position shown in FIG. 2 after housing shell i has been flipped down. The best value for distance "a" can be arrived at by simple experiment.

FIG. 4 also shows why turning sliding guide piece 4 makes it possible to remove it from guide grooves 15. The freely extending rear portions of shanks 17 need only be flexed inward to remove a projection 18 from a corresponding groove 15.

FIGS. 5–8 show another exemplary embodiment of the object of the invention with a sliding guide piece 4a, which is designed as a wire stirrup with several right-angle bends. Otherwise, the previous reference numbers are used again, insofar as the same parts or parts with the same function are involved. Thus there is no need for repeating these descriptions.

As can be seen with particular clarity in FIGS. 6–8, the wire stirrup, when seen from above, perpendicular to the sliding direction (FIGS. 7 and 8), is in the shape of a "U" with a yoke 33 and two shanks 34; each shank 34 has a partial length 34a, extending in the sliding direction, which is outside guide grooves 11, 15 in housing shell 1 and equipment carrier 2, as well as another partial length 34b, which, as a projection 19, engages in one of guide grooves 11 of housing shell 1. The free ends of partial lengths 34a which are the farthest away from each other are provided with projections 18, which point away from each other at right angles, to engage in guide grooves 15 of equipment carrier 2. It is especially clear from FIG. 6 that yoke 33 of the wire stirrup is bent upward with respect to a plane E-E defined by partial lengths 34b of shanks 34, i.e., the lengths which are the closest together, to such an extent that yoke 33 is able to slide over floor elevation 10 of housing shell 1, which carries guide grooves 11 of housing shell 1. Reference is made especially to FIG. 5 for this aspect. The bottom of lower rail part 22 of equipment carrier 2 is, according to FIG. 5, covered by a sealing section 35, through which electrical cables (not shown) can be passed in a protected manner, extending from support point P to the rear wall of the protective housing. Dimension "a" in FIG. 7 is to be given a value similar to that of dimension "a" in FIG. 4. The diagram is to scale.

The advantage of the wire stirrup shown in FIGS. 5–8 as a sliding guide piece 4a is to be seen in particular in the fact that this guide element can be produced very easily from a piece of wire.

Figure 9:
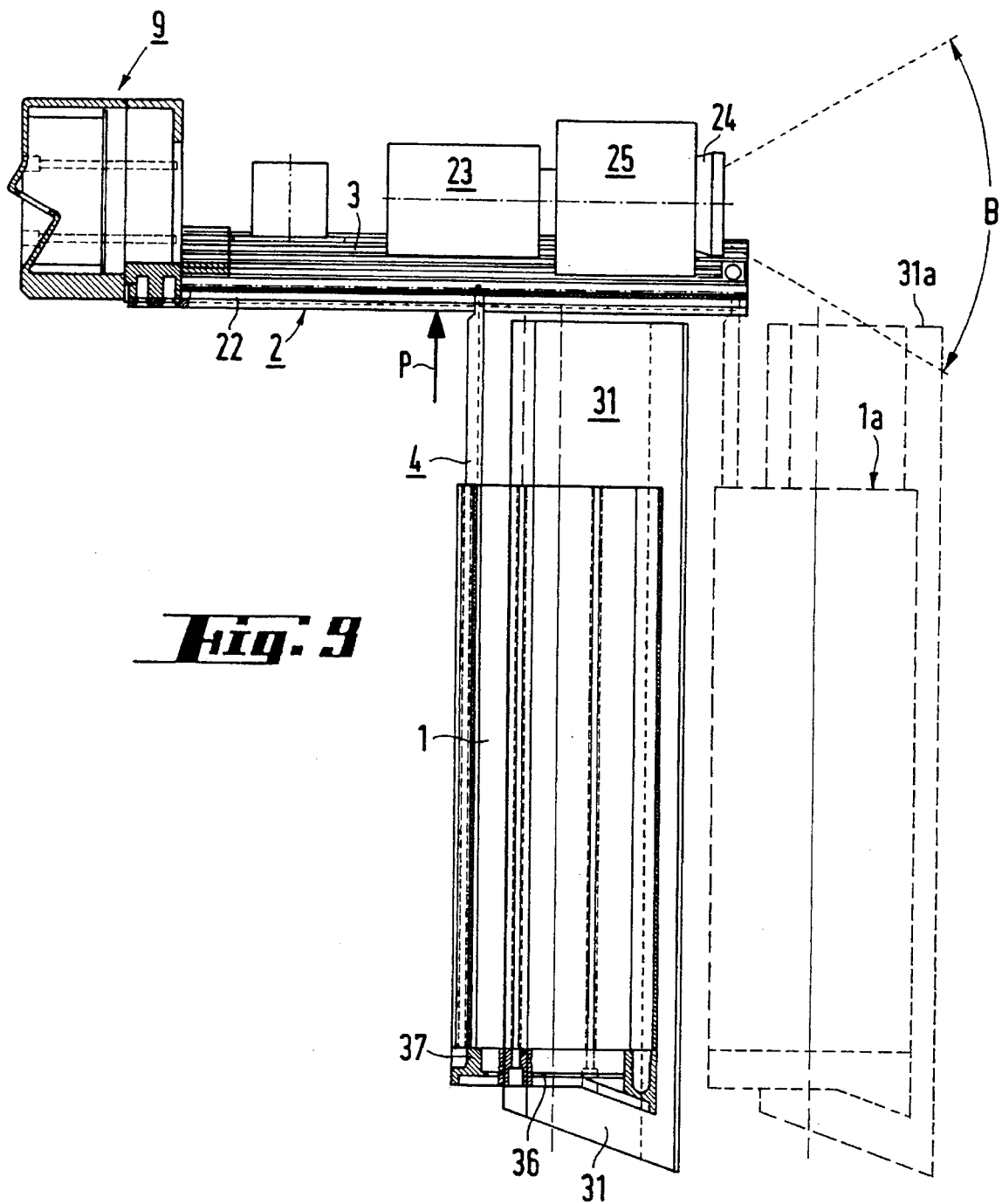
FIG. 9 shows a side view similar to FIG. 2 on a smaller scale to explain how corners are prevented from being cut off angular field B by the displacement of the swung-down housing shell.

FIG. 9 shows, on the right, a phantom view of the relationships which exist after housing shell 1 has merely been flipped down; its protective roof 31, in spite of the considerable length of sliding guide piece 4, however, still cuts off part of angular field B of lens 4, as a result of which it would be difficult to adjust the system during installation. By sliding the unit, which is suspended like a pendulum, toward the left after the shell has been flipped down as shown, top edge 31a of the protective roof arrives under equipment carrier 2 and therefore out of angular field B of the lens. FIG. 9 also shows window 36 with window frame 37, which is screwed tightly to the cut surface of housing shell 1 with a profiled gasket in between.

What is claimed is:

1. Housing assembly for optical equipment, comprising
    an equipment carrier having a pair of parallel first guide grooves,
    a housing shell received telescopically on said equipment carrier and being movable relative to said carrier in a sliding direction until said shell is withdrawn from said carrier, said housing shell having a pair of parallel second guide grooves, and
    a sliding guide piece having a pair of first projections slidably received in respective said first guide grooves and a second pair of projections slidably received in said second guide grooves, at least one of said first and second pairs of projections forming a pivot axis about which said housing shell can pivot relative to said equipment carrier when said shell is withdrawn from said carrier.

2. Housing assembly as in claim 1 further comprising first stop means effective to limit sliding movement of said first projections in said first guide grooves.

3. Housing assembly as in claim 2 wherein said first projections are elastically movable along their mutual axis in order to release said first projections from said first guide grooves.

4. Housing assembly as in claim 1 wherein said first guide grooves are mutually facing and said first projections extend away from each other.

5. Housing assembly as in claim 1 wherein said second guide grooves are mutually opposing and said second projections extend toward each other.

6. Housing assembly as in claim 1 wherein said first and second pairs of projections are separated from each other by a distance in said sliding direction.

7. Protective housing for optical equipment, said housing comprising
    an equipment carrier which can be mounted in a fixed position, said equipment carrier having an end and a first pair of parallel guide grooves extending toward said end,
    a housing shell which can be slid back and forth in a sliding direction relative to said equipment carrier, said housing shell having an end and a second pair of parallel guide grooves extending toward said end,
    a sliding guide piece having a first pair of projections received in said first pair of parallel guide grooves and a second pair of projections received in said second pair of parallel guide grooves, said sliding guide piece being slidable relative to both the housing shell and the equipment carrier in said sliding direction,
    one of said first and second pairs of projections forming a pivot bearing which allows the housing shell to pivot about the end of the equipment carrier when said housing shell has been pulled out as far as it can go relative to said equipment carrier.

8. Protective housing as in claim 7 wherein said first and second pairs of axial projections are separated by a distance in the sliding direction.

9. Protective housing as in claim 7 wherein the first pair of projections form the pivot bearing.

10. Protective housing as in claim 8 wherein the first pair of guide grooves face each other and the second pair of guide grooves face away from each other, said sliding guide piece comprising a pair of parallel shanks with a yoke therebetween, said first pair of projections being coaxial and facing outward from respective shanks, said second pair of projections being coaxial and facing inward from respective shanks.

11. Protective housing as in claim 10 wherein said equipment carrier has a lower rail part between said first pair of guide grooves and said yoke has an opening between the shanks where the projections of the first pair face outward, whereby said sliding guide piece can be slid backward over said rail when said housing shell is pivoted downward.

12. Protective housing as in claim 8 wherein said sliding guide piece is a formed wire stirrup comprising a pair of shanks and a yoke extending therebetween, each shank having a first portion and a second portion, said first portions constituting said first projections and being received in said first pair of guide grooves, said second portions lying outside of said first pair of guide grooves and having outwardly formed free ends constituting said second pair of projections.

13. Protective housing as in claim 12 wherein said housing shell has an elevated floor between said second pair of guide grooves and said first portions are parallel lengths of wire which define a plane, said yoke being sufficiently above said plane to be able to slide over said elevated floor when said housing is slid over said equipment carrier.

14. Protective housing as in claim 7 wherein said first guide grooves are blocked at said end of said equipment carrier and said second guide grooves are blocked at said end of said housing shell so that said projections cannot come out of respective grooves when said shell pivots about the end of the equipment carrier.

15. Protective housing as in claim 14 wherein said grooves are blocked with threaded plugs.

* * * * *